US011675573B2

(12) United States Patent
Beuch et al.

(10) Patent No.: US 11,675,573 B2
(45) Date of Patent: Jun. 13, 2023

(54) USING FUSION TO REDUCE ENCRYPTION IN STREAMING APPLICATIONS

(71) Applicant: International Business Machines Corporation, Armonk, NY (US)

(72) Inventors: Daniel Beuch, Rochester, MN (US); Adam Thomas Stallman, Rochester, MN (US); Michael K. Branson, Rochester, MN (US); Ryan K. Cradick, Oronoco, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 113 days.

(21) Appl. No.: 17/085,035

(22) Filed: Oct. 30, 2020

(65) Prior Publication Data

US 2022/0137940 A1 May 5, 2022

(51) Int. Cl.
*G06F 8/41* (2018.01)
*G06F 16/2455* (2019.01)
*H04L 9/06* (2006.01)

(52) U.S. Cl.
CPC ........ *G06F 8/433* (2013.01); *G06F 16/24568* (2019.01); *H04L 9/065* (2013.01)

(58) Field of Classification Search
None
See application file for complete search history.

(56) References Cited

U.S. PATENT DOCUMENTS

| 8,806,510 | B2* | 8/2014 | Andrade | G06F 9/5066 |
| | | | | 719/318 |
| 9,325,742 | B1* | 4/2016 | Barsness | H04L 63/20 |
| 9,569,178 | B1* | 2/2017 | Barsness | G06F 16/24568 |
| 9,582,250 | B1* | 2/2017 | Barsness | G06F 8/20 |
| 9,705,897 | B2* | 7/2017 | Barsness | G06F 16/24568 |
| 9,948,620 | B2* | 4/2018 | Barsness | H04L 9/085 |
| 9,985,940 | B2* | 5/2018 | Barsness | G06F 16/24568 |
| 9,986,002 | B2 | 5/2018 | Branson et al. | |
| 9,998,436 | B2* | 6/2018 | Barsness | H04L 67/1001 |
| 10,042,611 | B2* | 8/2018 | Barsness | G06F 16/24568 |

(Continued)

OTHER PUBLICATIONS

Cardellini, Valeria, et al. "Optimal operator replication and placement for distributed stream processing systems." ACM Sigmetrics Performance Evaluation Review 44.4 (2017): 11-22. (Year: 2017).*

(Continued)

*Primary Examiner* — Matthew J Brophy
(74) *Attorney, Agent, or Firm* — Garg Law Firm, PLLC; Rakesh Garg; Nathan Rau

(57) ABSTRACT

An embodiment includes analyzing data associated with an original flow graph comprising a plurality of operators of a stream computing application, including identifying a secure network connection between a first operator and a second operator that uses encryption. The embodiment fuses the first operator with the second operator such that a first logical function of the first operator is combined with a second logical function of the second operator. The embodiment then generates a modified flow graph as a modification of the original flow graph that combines the first operator and the second operator and lacks encryption between the first operator and the second operator.

20 Claims, 8 Drawing Sheets

(56) References Cited

U.S. PATENT DOCUMENTS

| | | | |
|---|---|---|---|
| 10,044,569 B2 | 8/2018 | Fawcett | |
| 10,346,407 B2 * | 7/2019 | Barsness | G06F 16/24568 |
| 10,884,039 B2 * | 1/2021 | Siebel | G06Q 10/06 |
| 10,977,089 B2 * | 4/2021 | Koster | G06F 9/5066 |
| 11,010,203 B2 * | 5/2021 | Koster | G06F 9/5061 |
| 11,320,469 B2 * | 5/2022 | Siebel | G01R 21/00 |
| 2011/0061060 A1 * | 3/2011 | Andrade | G06F 9/5066 718/100 |
| 2015/0120224 A1 * | 4/2015 | Siebel | G06F 16/24542 702/61 |
| 2015/0160932 A1 * | 6/2015 | Branson | G06F 16/9024 717/151 |
| 2015/0161289 A1 * | 6/2015 | Branson | G06F 16/9024 707/755 |
| 2015/0233983 A1 * | 8/2015 | Siebel | G06F 16/24542 702/61 |
| 2017/0060536 A1 * | 3/2017 | Barsness | G06F 8/20 |
| 2017/0060538 A1 * | 3/2017 | Barsness | G06F 8/20 |
| 2017/0171171 A1 * | 6/2017 | Barsness | H04L 67/1001 |
| 2017/0171223 A1 * | 6/2017 | Barsness | G06F 12/1408 |
| 2017/0269911 A1 * | 9/2017 | Barsness | G06F 8/20 |
| 2017/0300300 A1 * | 10/2017 | Cao | G06F 16/24568 |
| 2017/0366522 A1 * | 12/2017 | Barsness | G06F 16/24568 |
| 2017/0366523 A1 * | 12/2017 | Barsness | H04L 9/0894 |
| 2018/0227280 A1 * | 8/2018 | Barsness | H04L 9/085 |
| 2018/0234349 A1 * | 8/2018 | Barsness | H04L 47/27 |
| 2018/0234350 A1 * | 8/2018 | Barsness | H04L 47/27 |
| 2019/0124007 A1 * | 4/2019 | Cook | H04L 63/0428 |
| 2020/0042627 A1 * | 2/2020 | Siebel | G06Q 10/06 |
| 2022/0198003 A1 * | 6/2022 | Shaver | G06F 8/70 |

OTHER PUBLICATIONS

Khandekar, Rohit, et al. "Cola: Optimizing stream processing applications via graph partitioning." Middleware 2009: ACM/IFIP/USENIX, 10th International Middleware Conference, Urbana, IL, USA, Nov. 30-Dec. 4, 2009. Proceedings 10. Springer Berlin Heidelberg, 2009. (Year: 2009).*

Pietzuch, Peter, et al. "Network-aware operator placement for stream-processing systems." 22nd International Conference on Data Engineering (ICDE'06). IEEE, 2006. (Year: 2006).*

* cited by examiner

USING FUSION TO REDUCE ENCRYPTION IN STREAMING APPLICATIONS

BACKGROUND

The present invention relates generally to a method, system, and computer program product for stream computing. More particularly, the present invention relates to a method, system, and computer program product for using fusion to reduce encryption in streaming applications.

Database systems are typically configured to separate the process of storing data from accessing, manipulating, or using data stored in a database. In traditional, static database systems, data is first stored and indexed in memory before subsequent querying and analysis. In general, such static database systems are not always well-suited for performing real-time processing and analyzing streaming data. For example, static database systems are sometimes unable to store, index, and analyze large amounts of streaming data efficiently or in real time.

Streams-based computing and streams-based database computing have emerged in recent years as developing technologies for database systems. In a stream computing application, nodes connected to one another across a network allow data to flow from one node to the next. Such data flows encapsulate blocks of data in a "tuple." A tuple is a block of data of one or a variety of different data types, such as integer, float, Boolean, or string data. Groups of tuples are transmitted in sequences referred to as a "stream" or "data stream." In particular, it may occur that data arrives essentially continuously, as a stream of data points corresponding to an ongoing or continuous event.

For example, data representing the price of a particular stock may generally fluctuate over the course of a day, and a data stream management system may continuously receive updated stock prices, e.g., at equal time intervals or as the price changes. Other examples of such data streams include temperature or other environmental data collected by sensors, computer network analytics, patient health data collected at a hospital, or data describing a manufacturing process or other business process(es).

SUMMARY

The illustrative embodiments provide for using fusion to reduce encryption in streaming applications. An embodiment includes analyzing data associated with an original flow graph comprising a plurality of operators of a stream computing application that are executable on a plurality of nodes according to requests from a stream manager, where the plurality of operators comprises a first operator and a second operator, where the first operator includes a first logical function that processes a first input stream to create a first output stream, where the second operator includes a second logical function that processes the first output stream as a second input stream to create a second output stream, and where the analyzing comprises identifying a secure network connection between the first operator and the second operator that uses encryption. The embodiment also includes fusing the first operator with the second operator such that the first logical function is combined with the second logical function. The embodiment also includes generating a modified flow graph as a modification of the original flow graph that combines the first operator and the second operator, where the modified flow graph lacks the encryption between the first operator and the second operator. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
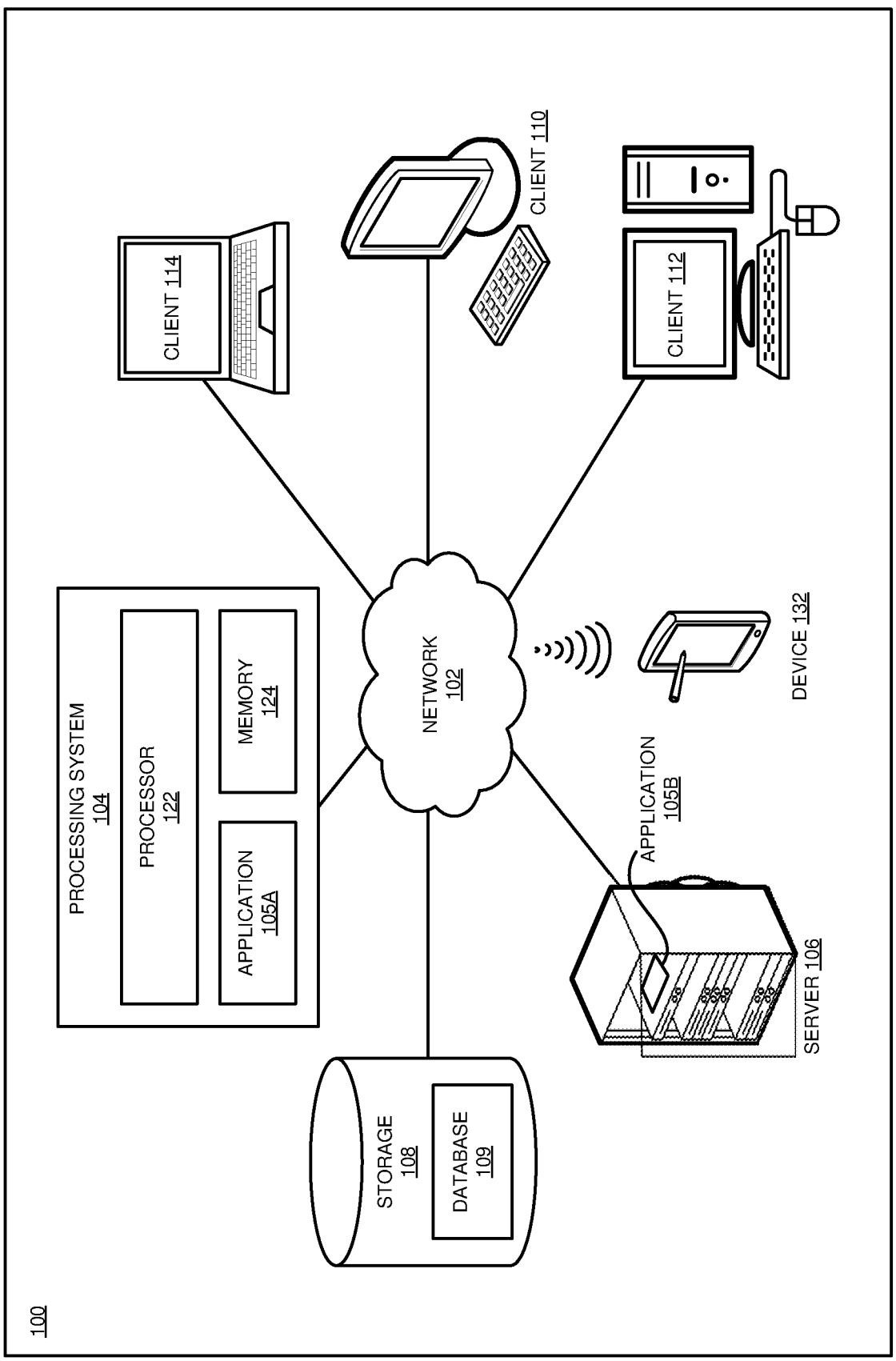
FIG. 1 depicts a block diagram of a network of data processing systems in which illustrative embodiments may be implemented.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing a stream computing application using this type of processing has opened up a new programming paradigm that will allow for development of a broad variety of innovative applications, systems, and processes, as well as present new challenges for application programmers and database developers.

The main components of stream computing applications include tuples, data streams, operators, processing elements (PEs), and jobs. A "tuple," is an individual piece of the data in a stream. In some embodiments, a tuple includes a structured list of attributes and attribute types, and each tuple on a data stream has a form specified by the type of stream.

A "stream" or "data stream," as used herein, refers to a running sequence of tuples. In some embodiments, a stream includes a sequence of structured tuples that may be consumed by operators on a tuple-by-tuple basis or according to a definition specified by a window (i.e., finite sequential group) of tuples. An "operator," as used herein, is a logical function that processes tuples from one or more incoming streams and may produce one or more new streams as output streams based on the processed tuples. A "processing element" or "PE" as used herein is an executable that encapsulates an operator or a plurality of fused operators that will run in the same process on a network node or computing resource, for example a server, client, host, container, or other computing device, such as a data processing system. A "node," as used herein, is a network node including any electronic device addressable over a computer network that is capable of creating, receiving, and/or transmitting information over the computer network, and may refer to may refer to an element, module, component, board, device or system.

A "flow Graph," as used herein, is a description of the connections between and functionality of the operators or processing elements in a stream computing application, and may refer to either an "logical flow graph" or a "physical flow graph." A "logical flow graph," as used herein, is a description of the connections between and functionality of the operators at development time according to the source code for the stream computing application. A "physical flow graph," as used herein, is a description of the entire stream computing application, including all of the processing elements, functionality of operators contained in each processing element, connections between the operators within each processing element, and connections between all processing elements. In some embodiments, a physical flow graph is an artifact produced by compiling the stream computing application. Also, the flow graphs described herein and depicted in the Figures are only examples and impose no limits on topologies of actual implementations of the present disclosure.

In some embodiments, at compile time, the compiler divides the operators and stream connections into processing elements. The compiler produces each processing element such that each processing element contains code for a single operator, or contains code for the two or more operators fused together into that processing element.

A streams processing job has a physical flow graph of processing elements that send data tuples between the processing elements at run time. The processing element operates on the incoming tuples, and produces output tuples. A processing element has an independent processing unit and runs on a host. The streams platform can be made up of a collection of hosts that are eligible for executing processing elements.

In a stream computing application, processing elements are thus connected to one another such that data flows from one processing element to the next over a network connection (e.g., over a TCP/IP socket). Data flows from one processing element to another in the form of a tuple having a sequence of one or more attributes associated with an entity.

Stream computing applications may handle massive volumes of data that should be processed efficiently and in real time to maintain value. Stream computing applications are able to achieve high performance streaming and scalability by distributing the processing elements across multiple nodes by creating executables (i.e., processing elements). This architecture allows a stream computing application to continuously ingest and analyze large volumes of data, e.g., hundreds of thousands of messages per second and up to petabytes of data per day. Accordingly, each processing element in a stream computing application may be required to process a received tuple within fractions of a second.

A network connection is used for transmitting data from one to another. Streams applications, or applications developed for a specific purpose, often ingest and process sensitive data, which therefore typically needs to be encrypted when transmitted over a network connection. The process of encrypting and decrypting data at neighboring operators may in some situations negate performance enhancements gained by the distributed architecture of a stream computing application. Thus, encrypted communications between processing elements is a significant issue in streams processing due to the negative impact on performance caused by encryption/decryption-related processing.

The term "sensitive data," as used herein, refers to data representative of information that an individual or business entity considers secret or confidential or that an individual or business entity would reasonably consider private, and includes information that is subject to statutory, regulatory, or other types of compliance requirements for encryption while being electronically transmitted over a network. For example, sensitive data includes data representative of Personally Identifiable Information (PII), Protected Health Information (PHI), or Payment Card Information Data Security Standard (PCI DSS) information.

An advantage of products, such as IBM Streams, is the massive scalability and performance (IBM is a registered trademark of International Business Machines corporation). Performance advantages include improvements in terms of being able to ingest, filter, analyze, and correlate potentially massively larger volumes of continuous data streams in a given time frame than was previously possible. While encryption technologies have gotten faster and better via hardware and chip support, a performance impact is still recognized in high performance streams processing.

The negative impact on performance in streams processing caused by encryption is resolved by implementations of the present disclosure. The systems and methods of the present disclosure address problems particular to streams processing of potentially sensitive data by use of an operator fusion management system in a stream computing environment that identifies sensitive data that needs to be encrypted when transmitted between stream operators and determines whether the encryption can be avoided by combining (i.e., by fusion) the stream operators such that the code for the operators is joined into a single processing element. Once two operators are fused together, they communicate through function calls and tuples are passed from one of the fused operators to the next by using memory references in the local memory of the host node, as opposed to being transmitted across a network. Thus, the data stream between fused operators no longer needs to be encrypted and decrypted. Leveraging operator fusion management techniques to eliminate encryption operations yields various benefits such as data processing efficiency, stream computing application performance, or the like. Fusing can significantly reduce the cost of communication and improve latency and throughput.

In an illustrative embodiment, a streams management system analyses an original logical flow graph that has a plurality of operators of a stream computing application to identify where secure network connections would be needed. In some embodiments, the streams management system generates a modified physical flow graph, for example by modifying the source code of the stream computing application, in order to eliminate some or all of the secure network connections.

In some embodiments, the operator fusion management system operates at compile time to identify sensitive data that needs to be encrypted when transmitted between stream operators and determines whether the encryption can be avoided by fusing the operators into a single processing element. In some such embodiments, the operator fusion management system fuses the operators, resulting in a single processing element having code from the fused operators, and a physical flow graph having the operators fused into a single processing element, and encryption between the operators is thereby avoided.

In alternative embodiments, the operator fusion management system operates at run time to identify sensitive data that needs to be encrypted when transmitted between stream operators and determines whether the encryption can be avoided by fusing the operators into a single processing element. In some such embodiments, the operator fusion management system modifies the physical flow graph to combine the operators into a single processing element where it determines that encryption can be avoided.

In some embodiments, the streams management system operates at run time to transmit a notification regarding the modified physical flow graph to a user interface. In some such embodiments, the notification includes image data for rendering a visual representation of the modified flow graph. In some embodiments, the streams management system then receives a response from the user and updates the physical flow graph based on the user response. In some embodiments, the user response includes explicit placement constraints added by the user to the source code as fusion instructions for one or more operators. Alternatively, in some embodiments, the streams management system proceeds with the modified physical flow graph without seeking user input.

In some embodiments, the operator fusion management system operates at compile time to identify sensitive data that needs to be encrypted when transmitted between stream operators and determine whether the encryption can be avoided by fusing the operators into a single processing element. In some such embodiments, the operator fusion management system creates a physical flow graph in which two or more operators are fused into a single processing element where the operator fusion management system determines that encryption can be avoided.

In some embodiments, the streams management system includes a logical flow graph and a stream manager, which in turn includes an encryption manager and a scheduler. In some embodiments, developers using the streams management system submit streaming applications using code that defines a logical flow graph, which is used at compile time to generate processing elements and a physical flow graph.

In some embodiments, the scheduler of the stream manager places the operators in the logical flow graph in one or more processing elements at compile time, during which the scheduler assigns the processing elements to run on one or more computing nodes and generates a physical flow graph based on these assignments. In some embodiments, the scheduler of the stream manager fuses two or more operators in the physical flow graph into a single processing element at run time, and generates a modified physical flow graph reflecting the fused operators in the single processing element.

In some embodiments the scheduler allows the user to override the changes made by the scheduler at compile time or at run time by either revising source code of the stream computing application to further revise the physical flow graph, or issue an instruction to undo the changes made by the scheduler. In some such embodiments, the scheduler reviews the user's changes for errors and alerts the user if errors are detected. Otherwise, the scheduler updates the physical flow graph as needed.

In illustrative embodiments, a scheduler receives a stream computing application that defines a flow graph that describes the stream network topology, such as the location, arrangement, connections, and functionality of various operators. In some embodiments, a graph analyzer receives the flow graph and analyzes the flow graph in order to identify connections between operators that require a secure connection. In some embodiments, the graph analyzer receives a flow graph that designates which connections require a secure connection. In alternative embodiments, the graph analyzer receives a flow graph that includes information that the graph analyzer uses to deduce which connections between operators require a secure connection. For example, in some embodiments, the flow graph includes an indication of connections that potentially will transfer sensitive data, or an indication of operators that potentially output sensitive data, or a description of the data from which the graph analyzer may interpret as potentially sensitive data. In some such embodiments, the stream computing application includes a parameter on the data stream, input ports, or output ports to identify that a secure connection is required. Alternatively, in some such embodiments, the stream computing application includes annotations applied to the code indicating where any particular operator, stream, group of operators and streams, or tuple parameter needs to be encrypted. In some embodiments, the graph analyzer uses rule-based patterns and/or learned patterns to detect sensitive data fields in the code for the stream computing application.

In some embodiments, an operator fusion module receives the analysis results from the graph analyzer. In some such embodiments, the operator fusion module fuses operators that require secure communication so that the secure communication will no longer be required. In some such embodiments, the operator fusion module fuses the operators by combining the code for the operators such that the resulting combined code is executed by the same process. As a result, communication between the operators is performed within the combined code through function calls and tuples passed from one of the fused operators to the next by using memory references in the local memory of the host node, as opposed to being transmitted across a network.

In some embodiments, a graph update module generates a new logical flow graph, for example by modifying the source code of the stream computing application, in order to eliminate some or all of the secure network connections. In some embodiments, the graph update module modifies the source code by inserting explicit partition placement constraints in the code that are recognized by the compiler and cause the compiler to fuse designated neighboring operators into a single processing element, thereby eliminating the encrypted connections and allowing the operators to communicate without a network connection.

In some embodiments, the graph update module outputs the new logical flow graph to a user interface. For example, the user interface may include a web-based streams management console that generates a visual representation of the new flow graph that a user may view. In some embodiments, the user interface may display source code for the new logical flow graph for review and editing by the user. In some embodiments, the displayed source code includes partition placement constraints associated with the changes in the new logical flow graph that are displayed for review and editing by the user.

In some embodiments, a user change analysis module provides functionality that allows a user to change the code for the new logical flow graph or request that the code be reverted back to an earlier version of the code. In some embodiments, the user change analysis module analyzes any changes made by the user, for example to check for errors or for sub-optimal aspects of the logical flow graph as changed by the user. In some such embodiments, the user change analysis module transmits an alert to the user interface regarding any such errors or performance issues detected by the user change analysis module.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
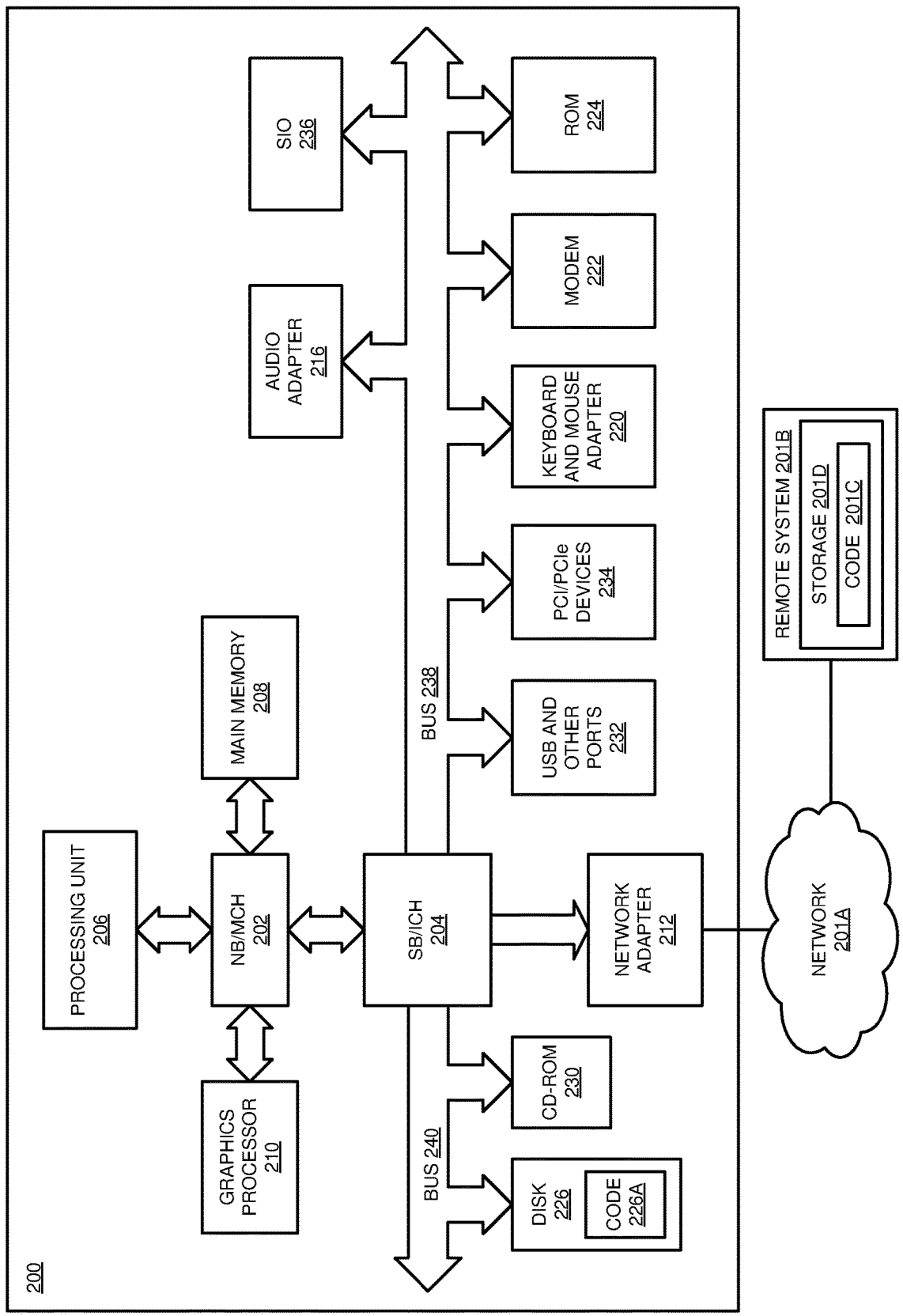
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Data processing system 104 couples to network 102. Software applications may execute on any data processing system in data processing environment 100. Any software application described as executing in processing system 104 in FIG. 1 can be configured to execute in another data processing system in a similar manner. Any data or information stored or produced in data processing system 104 in FIG. 1 can be configured to be stored or produced in another data processing system in a similar manner. A data processing system, such as data processing system 104, may contain data and may have software applications or software tools executing computing processes thereon. In an embodiment, data processing system 104 includes memory 124, which includes application 105A that may be configured to implement one or more of the data processor functions described herein in accordance with one or more embodiments.

Server 106 couples to network 102 along with storage unit 108. Storage unit 108 includes a database 109 configured to store data as described herein with respect to various embodiments, for example image data and attribute data. Server 106 is a conventional data processing system. In an embodiment, server 106 includes processing elements of a stream processing application 105B that may be configured to implement one or more of the processor functions described herein in accordance with one or more embodiments.

Clients 110, 112, and 114 are also coupled to network 102. A conventional data processing system, such as server 106, or client 110, 112, or 114 may contain data and may have software applications or software tools executing conventional computing processes thereon.

Only as an example, and without implying any limitation to such architecture, FIG. 1 depicts certain components that are usable in an example implementation of an embodiment. For example, server 106, and clients 110, 112, 114, are depicted as servers and clients only as example and not to imply a limitation to a client-server architecture. As another example, an embodiment can be distributed across several data processing systems, and a data network as shown, whereas another embodiment can be implemented on a single data processing system within the scope of the illustrative embodiments. Conventional data processing systems 106, 110, 112, and 114 also represent example nodes in a cluster, partitions, and other configurations suitable for implementing an embodiment.

Device 132 is an example of a conventional computing device described herein. For example, device 132 can take the form of a smartphone, a tablet computer, a laptop computer, client 110 in a stationary or a portable form, a wearable computing device, or any other suitable device. In an embodiment, device 132 sends requests to server 106 to perform one or more data processing tasks by stream processing application 105B such as initiating processes described herein. Any software application described as executing in another conventional data processing system in FIG. 1 can be configured to execute in device 132 in a similar manner. Any data or information stored or produced in another conventional data processing system in FIG. 1 can be configured to be stored or produced in device 132 in a similar manner.

Server 106, storage unit 108, data processing system 104, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 106 may provide data, such as boot files, operating system images, and applications to clients 110, 112, and 114. Clients 110, 112, and 114 may be clients to server 106 in this example. Clients 110, 112, 114, or some combination thereof, may include their own data, boot files, operating system images, and applications. Data processing environment 100 may include additional servers, clients, and other devices that are not shown.

In the depicted example, memory 124 may provide data, such as boot files, operating system images, and applications to processor 122. Processor 122 may include its own data, boot files, operating system images, and applications. Data processing environment 100 may include additional memories, processors, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a conventional client data processing system and a conventional server data processing system. Data processing environment 100 may also employ a service-oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a conventional computer, such as data processing system 104, server 106, or clients 110, 112, and 114 in FIG. 1, or another type of device in which computer usable program code or instructions implementing the processes may be located for the illustrative embodiments.

Data processing system 200 is also representative of a conventional data processing system or a configuration therein, such as conventional data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid-state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
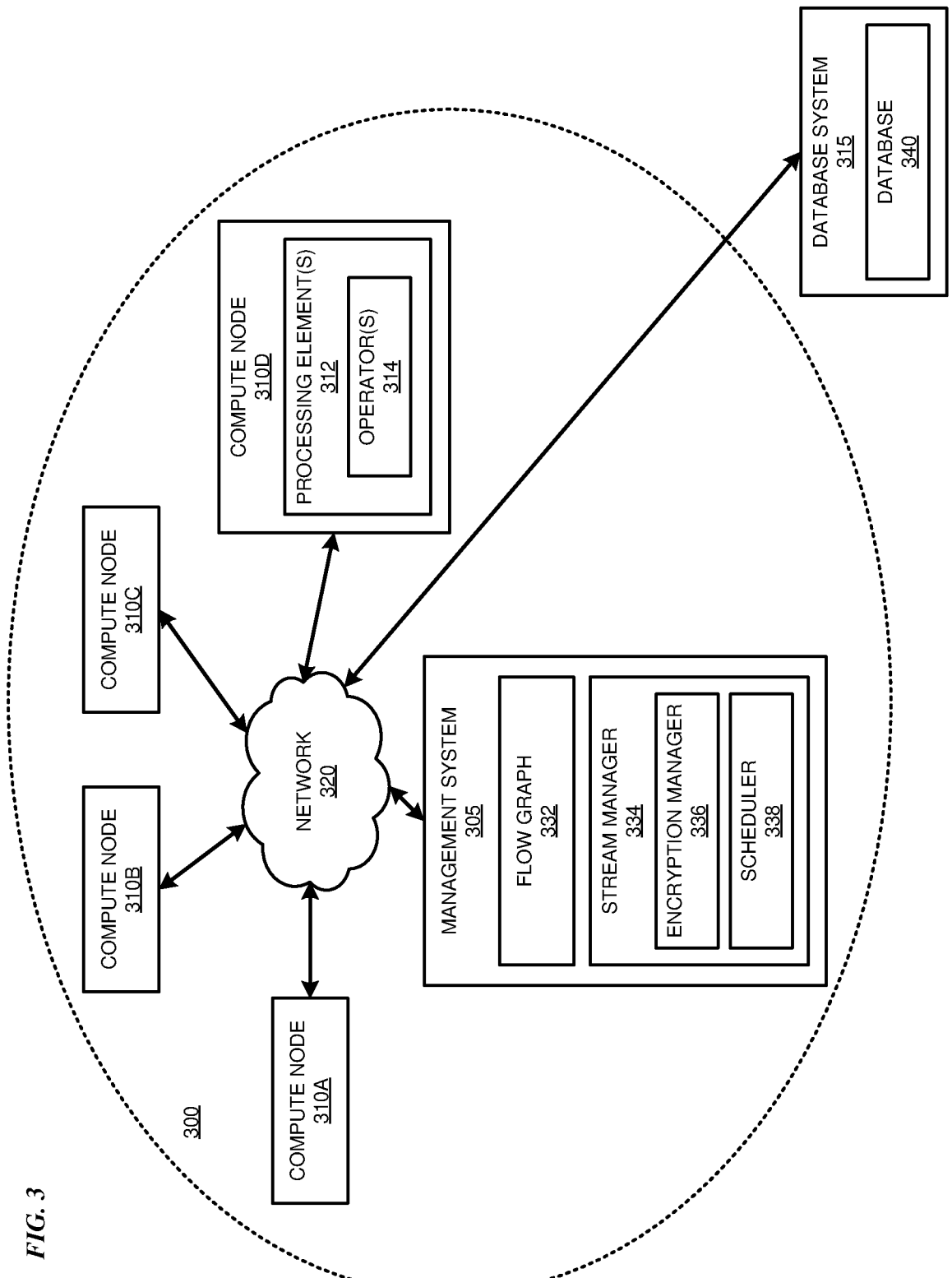
FIG. 3 depicts a block diagram of an example stream computing application environment in accordance with an illustrative embodiment.

With reference to FIG. 3, this figure depicts a block diagram of an example streams application environment 300 in accordance with an illustrative embodiment. In an embodiment, the streams application environment 300 is configured to execute a stream computing application, which is an example of application 105A/105B of FIG. 1.

In the illustrated embodiment, the streams application environment 300 includes a streams management system 305 and a plurality of compute nodes 310A-310D (herein generically referred to as nodes 310)—i.e., hosts—which are communicatively coupled to each other using one or more communications networks 320. In an embodiment, the communications network 320 includes one or more servers, networks, or databases, and uses a communication protocol to transfer data among compute nodes 310. In an embodiment, a database system 315 containing a database 340 is communicatively coupled to network 320 for communication with compute nodes 310. In a particular embodiment, database system 315 is an example of server 106 with database 109 of FIG. 1, and nodes 310A-310D are examples of data processing system 104, clients 110, 112, and 114, and device 132 of FIG. 1.

In the illustrated embodiment, the one or more compute nodes 310A-310D are configured as shown for compute node 310D, such that each of the compute nodes 310A-310D comprise one or more processing elements 312, and each processing element includes one or more operators 314. Operators 314 are the fundamental building blocks of the stream computing application. In some embodiments, the compute nodes 310A-310D each run a Linux operating system, and each processing element 312 represents a Linux process, and within each Linux process there are operators 314 that run one or more aspects of the stream computing application.

In some embodiments, the streams management system 305 includes a flow graph 332 and a stream manager 334, which in turn includes an encryption manager 336 and a scheduler 338. In some embodiments, the streams management system 305 receives the flow graph 332 as a physical flow graph for a compiled stream computing application from an external development system or compiler. In some embodiments, streams application environment 300 includes a development environment or compiler, and allows developers to submit source code that defines flow graph 332 as a logical flow graph.

In some embodiments, the scheduler 338 of the stream manager 334 places the operators 314 in the logical flow graph in one or more processing elements 321 at compile time, during which the scheduler 338 assigns the processing elements 312 to run on one or more computing nodes 310A-310D and generates a physical flow graph based on these assignments. In some embodiments, the scheduler 338 of the stream manager 334 fuses two or more operators 314 in the physical flow graph into a single processing element 312 at run time, and generates a modified physical flow graph reflecting the fused operators 314 in the single processing element 312.

In some embodiments the scheduler 338 allows the user to override the changes made by the scheduler 338 at compile time or at run time by either revising source code of the stream computing application to further revise the physical flow graph, or issue an instruction to undo the changes made by the scheduler 338. In some such embodiments, the scheduler 338 reviews the user's changes for errors and alerts the user if errors are detected. Otherwise, the scheduler 338 updates the logical flow graph as needed in preparation for compiling the stream computing application.

Figure 4:
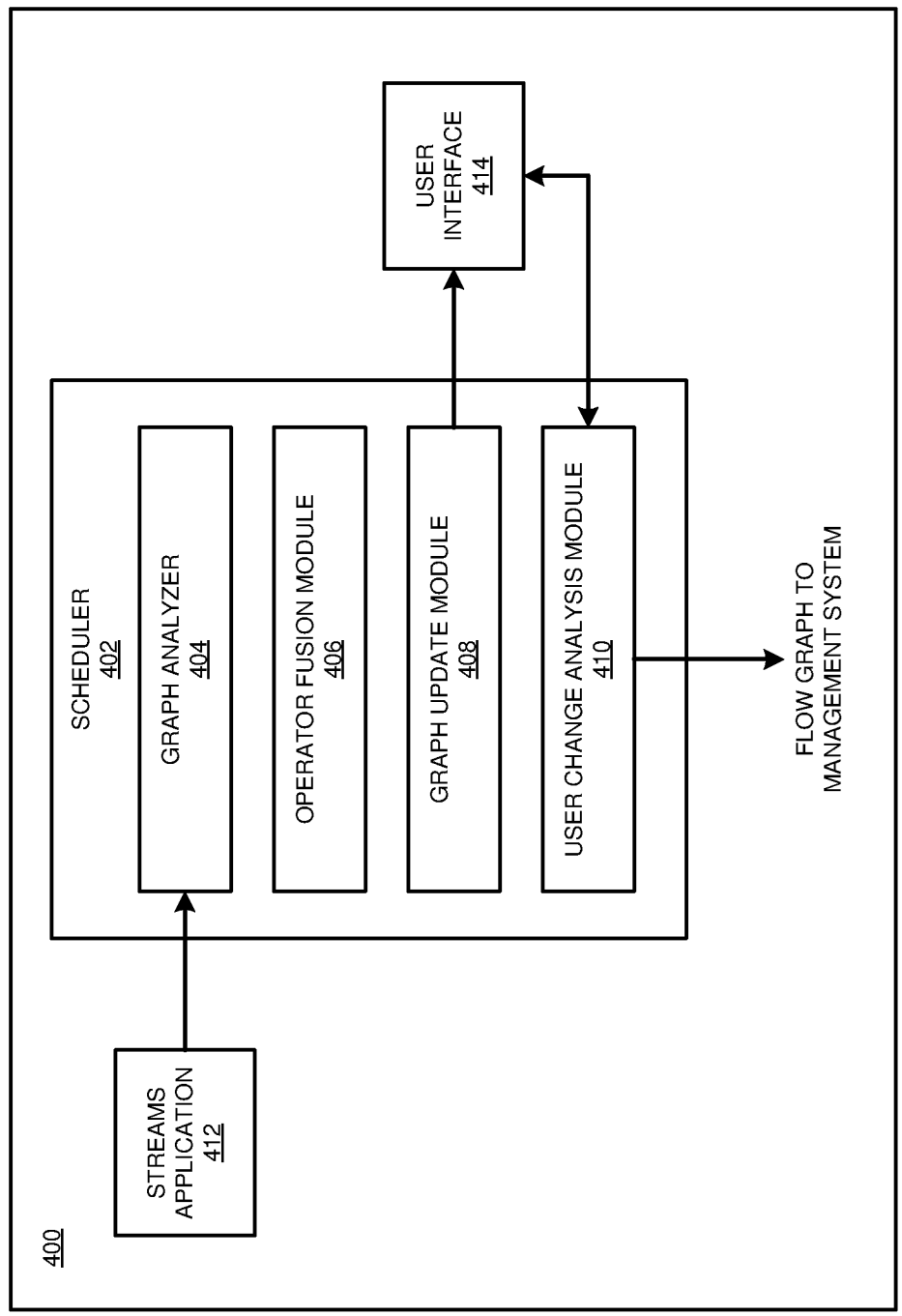
FIG. 4 depicts a block diagram of an example scheduler in accordance with an illustrative embodiment.

With reference to FIG. 4, this figure depicts a block diagram 400 of an example scheduler 402 in accordance with an illustrative embodiment. In an embodiment, the scheduler 402 is an example of scheduler 338 of FIG. 3.

In the illustrated embodiment, the scheduler includes a graph analyzer 404, an operator fusion module 406, a graph update module 408, and a user change analysis module 410. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, the scheduler 402 receives a stream computing application 412 that defines a flow graph that describes the stream network topology, such as the location, arrangement, connections, and functionality of various operators. In the illustrated embodiment, the graph analyzer 404 receives the flow graph and analyzes the flow graph 332 in order to identify connections between operators that require a secure connection. In some embodiments, the graph analyzer 404 receives a flow graph and analyzes the flow graph in order to identify connections between operators that require a secure connection. In alternative embodiments, the graph analyzer 404 receives a flow graph that designates which connections require a secure connection. In alternative embodiments, the graph analyzer 404 receives a flow graph that includes information that the graph analyzer 404 uses to deduce which connections between operators require a secure connection. For example, in some embodiments, the flow graph includes an indication of connections that potentially will transfer sensitive data, or an indication of operators that potentially output sensitive data, or a description of the data from which the graph analyzer 404 may interpret as potentially sensitive data. In some such embodiments, the stream computing application 412 includes a parameter on the data stream, input ports, or output ports to identify that a secure connection is required. Alternatively, in some such embodiments, the stream computing application 412 includes annotations applied to the code indicating where any particular operator, stream, group of operators and streams, or tuple parameter needs to be encrypted. In some embodiments, the graph analyzer 404 uses rule-based patterns and/or learned patterns to detect sensitive data fields in the code for the stream computing application 412.

In the illustrated embodiment, the operator fusion module 406 receives the analysis results from the graph analyzer 404. In the illustrated embodiment, the operator fusion module 406 fuses operators that require secure communication so that the secure communication will occur through function calls and tuples passed from one of the fused operators to the next by using memory references in the local memory of the host node, as opposed to being transmitted across a network, and the code for the operators will be executed by the same process.

In the illustrated embodiment, the graph update module 408 generates a new physical flow graph, for example by modifying the source code of the stream computing application, in order to eliminate some or all of the secure network connections. In some embodiments, the graph update module 408 modifies the source code by inserting explicit partition placement constraints in the code that are recognized by the compiler and cause the compiler to fuse designated neighboring operators into a single processing element, thereby eliminating the encrypted connections and allowing the operators to communicate without a network connection.

In some embodiments, the graph update module 408 outputs the new physical flow graph to a user interface 414. For example, the user interface 414 may include a web-based streams management console that generates a visual representation of the new flow graph that a user may view. In some embodiments, the user interface 414 may display source code for the new physical flow graph for review and modifying by the user. In some embodiments, the displayed source code includes partition placement constraints associated with the changes in the new physical flow graph that are displayed for review and editing by the user.

In some embodiments, a user change analysis module 410 provides functionality that allows a user to change the code for the new physical flow graph or request that the code be reverted back to an earlier version of the code. In some embodiments, the user change analysis module 410 analyzes any changes made by the user, for example to check for errors or for sub-optimal aspects of the physical flow graph as changed by the user. In some such embodiments, the user change analysis module 4110 transmits an alert to the user interface 414 regarding any such errors or performance issues detected by the user change analysis module.

Figure 5:
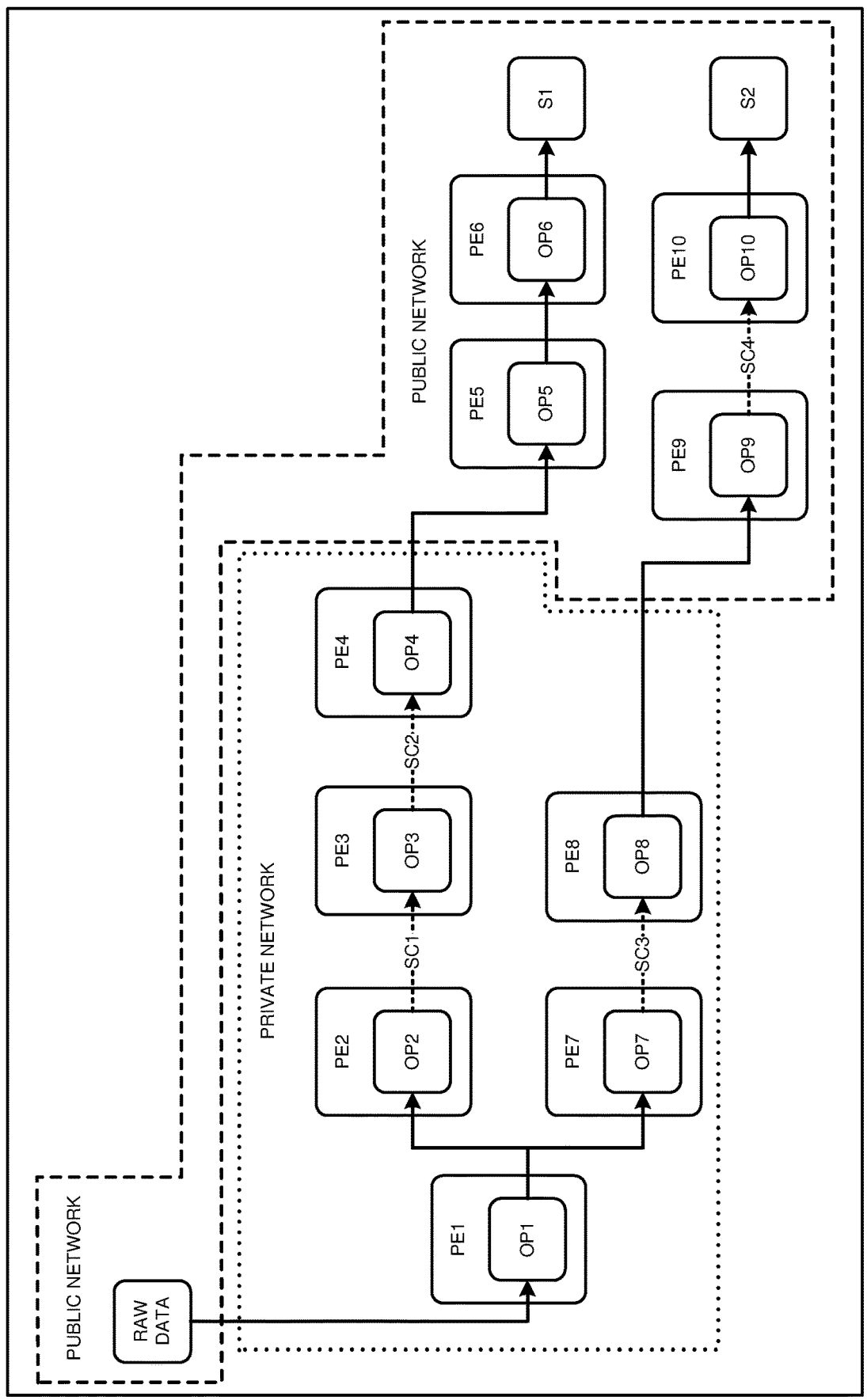
FIG. 5 depicts a block diagram of a simplified example flow graph in accordance with an illustrative embodiment.

With reference to FIG. 5, this figure depicts a block diagram of a simplified example flow graph for a streaming application in accordance with an illustrative embodiment. The flow graph shown in FIG. 5 is shown for clarity purposes as a non-limiting example of a streaming application that can benefit from disclosed embodiments. The flow graph may be, for example, a simplified physical flow graph for the stream computing application 412 of FIG. 4.

In the illustrated embodiment, the flow graph includes a total of ten stream operators OP1-OP10 on respective processing elements PE1-PE10. The operators OP1-OP10 are representative of any streams operators. In the illustrated embodiment, operator OP1 is the beginning point of the application. The operator OP1 receives data from a data source designated RAW DATA, which may be representative of one or more sources of periodic and/or continuous data. The first operator OP1 may be an ingest stage for the application and consumes continuous live data from one or more disparate data sources, for example machine sensors, live feeds from social media sites, databases, weather stations, or file systems, where the data may include structured data such as XML or JSON data and/or unstructured data such as text, voice, or video data.

The remaining operators OP2-OP9 perform various functions on the streaming data while the data is being transmitted to sinks S1 and S2. In the illustrated embodiment, the flow graph spans a private network, for example a corporate or government intranet or private cloud, and public network, for example that are Internet-accessible and may include public cloud networking.

In the example shown in FIG. 5, the flow graph includes four secure connections SC1-SC4 that are shown and located for explanatory purposes. In some embodiments, a scheduler (e.g., scheduler 402 of FIG. 4) receives a stream computing application defining the flow graph in FIG. 5 that describes the stream network topology, such as the location, arrangement, connections, and functionality of various operators OP1-OP10. A graph analyzer (e.g., graph analyzer 404 of FIG. 4) receives the flow graph and analyzes the flow graph in order to identify connections SC1-SC4 between operators that require a secure connection. The secure connections SC1-SC4 are identified to an operator fusion module (e.g., operator fusion module 406 of FIG. 4), which then fuses the operators that require the secure communication so that the secure communication will occur in the memory of a PE or node rather than across a network connection. Thus, in the illustrated embodiment, the operator fusion module fuses operators OP2-OP4, operators OP7-OP8, and operators OP9-OP10.

Figure 6:
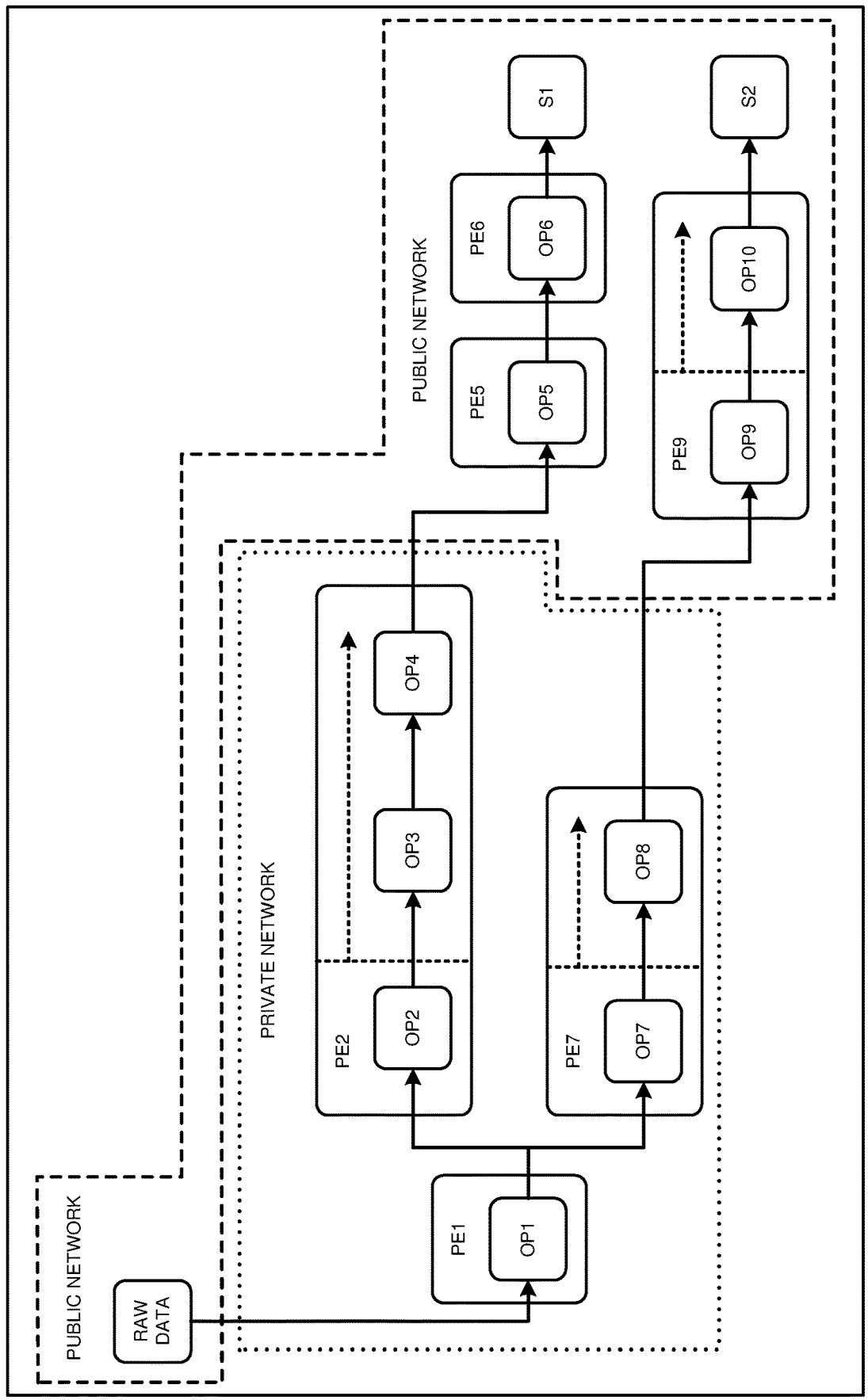
FIG. 6 depicts a block diagram of the flow graph from FIG. 5 as modified by an operator fusion module in accordance with an illustrative embodiment.

With reference to FIG. 6, this figure depicts the flow graph from FIG. 5 as modified by an operator fusion module in accordance with an illustrative embodiment. The flow graph shown in FIG. 6 is shown for clarity purposes as a non-limiting example of a stream computing application that can benefit from disclosed embodiments.

As shown in FIG. 6, the operators OP2-OP4 are fused, resulting in OP2-OP4 all being on processing element PE2. The operators OP7-OP8 are fused, resulting in OP7-OP8 both being on processing element PE7. The operators OP9-OP10 are fused, resulting in OP9-OP10 both being on processing element PE9. As shown in FIG. 6, all four of the secure connections SC1-SC4 shown in FIG. 5 have been eliminated, which removes the need to perform encryption/decryption between OP2 and OP3, between OP3 and OP4, between OP7 and OP8, and between OP9 and OP10. As a result, the negative impact on performance caused by those encryption/decryption operations has been removed in the flow graph shown in FIG. 6, resulting in improved performance for the stream computing application.

Figure 7:
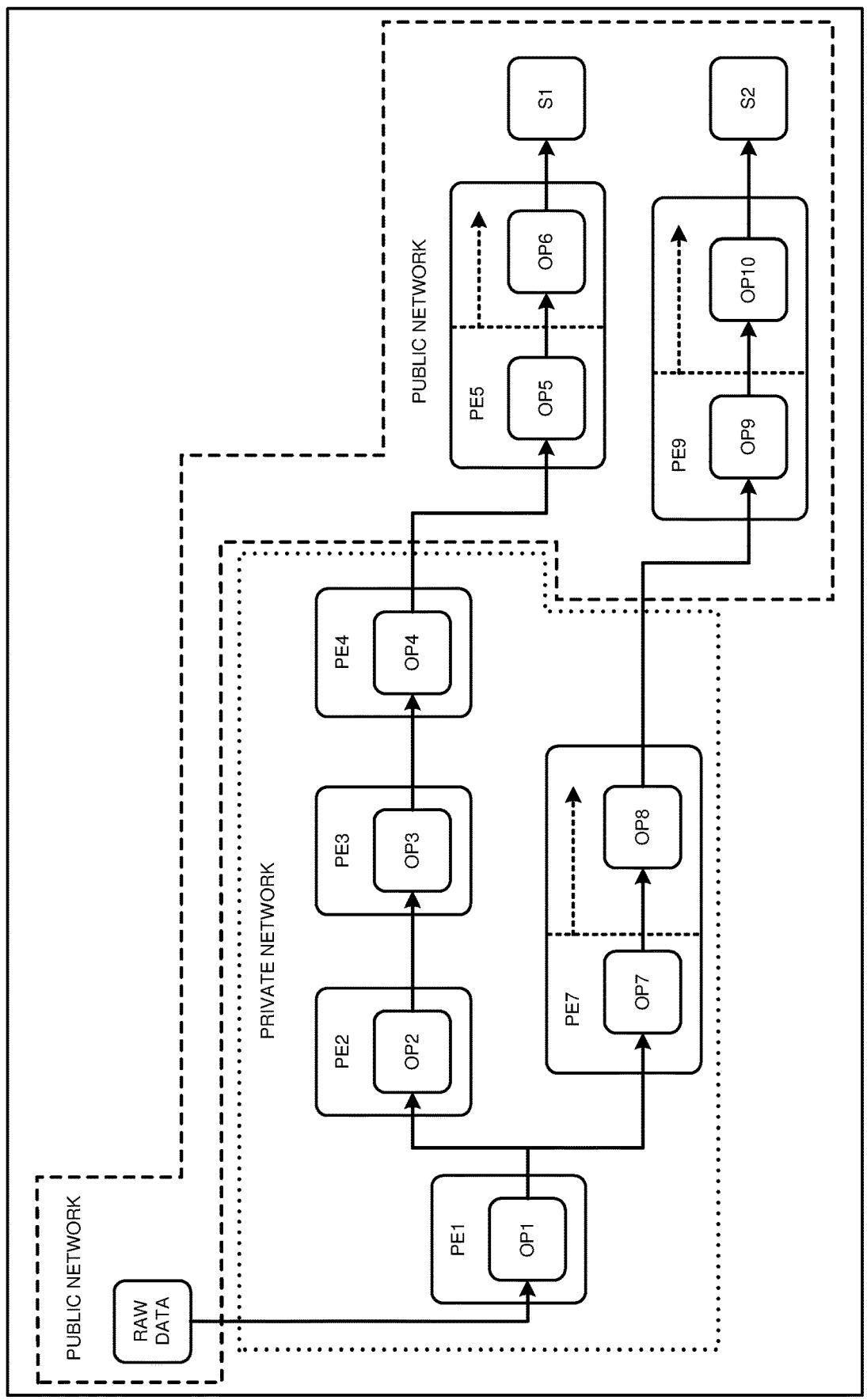
FIG. 7 depicts a block diagram of the flow graph from FIG. 5 as alternatively modified in accordance with an illustrative embodiment.

With reference to FIG. 7, this figure depicts an alternative modification of the flow graph from FIG. 5 in accordance with an illustrative embodiment. In some embodiments, the alternative modification shown in FIG. 7 is generated by an alternative embodiment of an operator fusion module. In some embodiments, the alternative modification shown in FIG. 7 is a modification of the flow graph shown in FIG. 6 that was modified by a user in response to receiving the flow graph shown in FIG. 6.

In FIG. 7, the user or operator fusion module may determine that the sensitive information being transmitted on SC1 and SC2 (shown in FIG. 5) is corporate information that may be considered sensitive data. However, since SC1 and SC2 are within the private network, which may be a corporate intranet for this example. In some such embodiments, since the network is private, the secure connections are simply removed and the operators OP2-OP4 are kept on distributed processing elements PE2-PE4, as opposed to fusing the operators OP2-OP4, for performance reasons. On the other hand, the user may decide to indicate to the scheduler that encryption is desired between PE5 and PE6 because they are connected by a public network, even though sensitive information is not expected to travel from PE5 to PE6. In response, the scheduler fuses operators OP5 and OP6, resulting in OP5 and OP6 both being on processing element PE5. In some embodiments, the scheduler informs the user of the operators OP5 and OP6 being fused instead of implementing an encrypted connection because the fused-operators options provides better performance than using encrypted communication.

Figure 8:
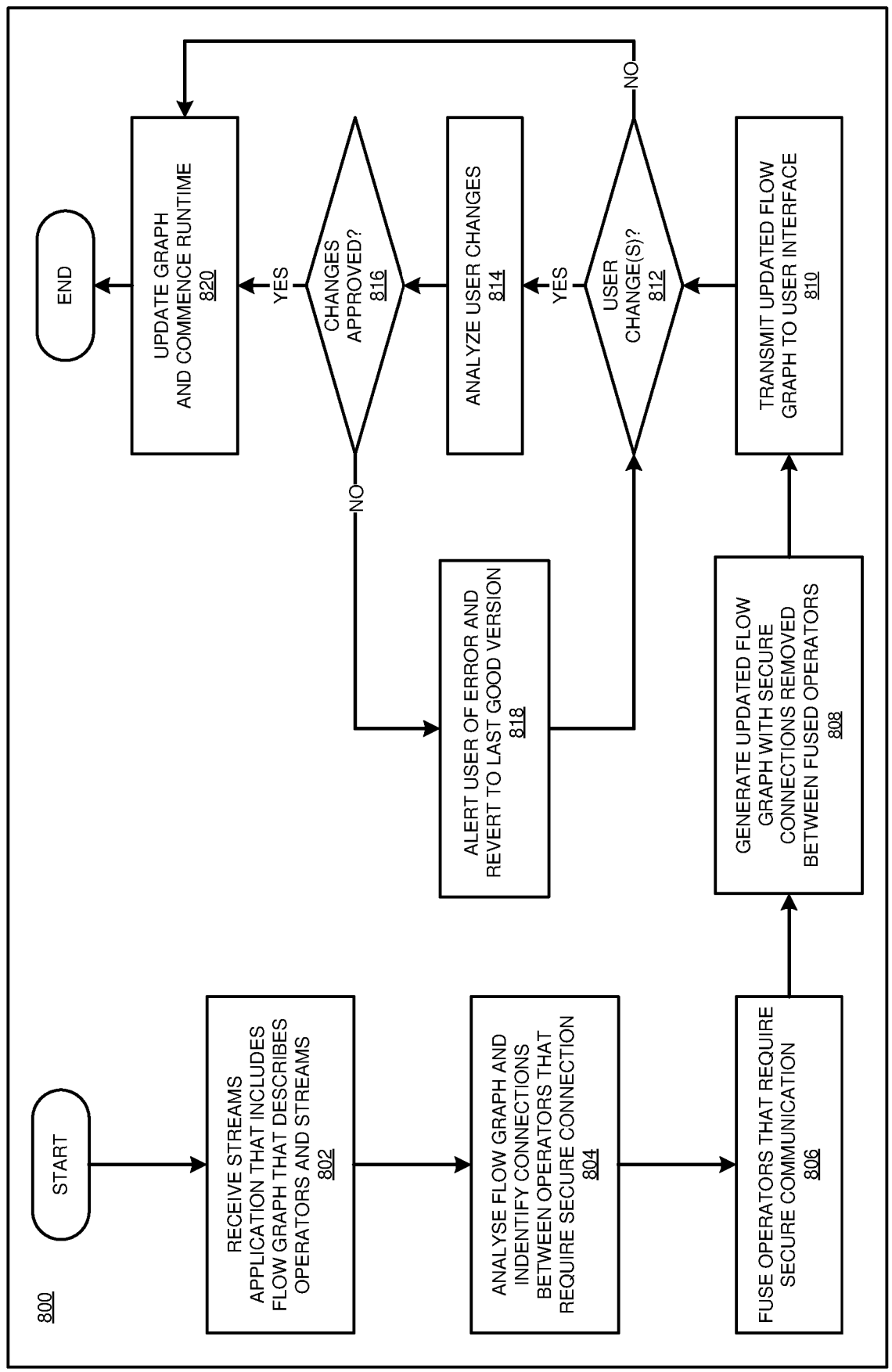
FIG. 8 depicts a flowchart of an example process for using fusion to reduce encryption in streaming applications in accordance with an illustrative embodiment.

With reference to FIG. 8, this figure depicts a flowchart of an example encryption management process 800 in accordance with an illustrative embodiment. In a particular embodiment, the streams management system 305 in FIG. 3 carries out the process 800 using the scheduler 338 shown in FIG. 3 or the scheduler 402 shown in FIG. 4.

In an embodiment, at block 802, the process 800 receives a stream computing application that includes a flow graph that describes operators and streams. Next, at block 804, the process 800 analyzes the flow graph and identifies connections between operators that require secure connection. Next, at block 806, the process 800 fuse operators that require secure communications. Then at block 808, the process 800 generates an updated flow graph with secure connections removed between fused operators. Then at block 810, the process 800 transmits the updated flow graph to a user interface. Then at block 812, the process 800 checks for any changes made by the user to the flow graph sent to the user interface. If changes are found, then at block 814, the process 800 analyzes the user changes, for example to check for errors and/or performance issues. Then at block 816, the process 800 if a problem is found, the process goes to block 818, where the process 800 alerts the user of errors and reverts to last good version, and then returns to block 812 to give the user an opportunity to make further changes in response to the alert. Otherwise, the process continues to block 820 where the process 800 updates the graph and notifies the streams management that the flow graph is ready to commence runtime.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer implemented method comprising:
analyzing, at compile time, data associated with an original flow graph comprising a plurality of operators of a stream computing application that are executable on a plurality of nodes according to requests from a stream manager,
wherein the plurality of operators comprises a first operator and a second operator,
wherein the first operator includes a first logical function that processes a first input stream to create a first output stream,
wherein the second operator includes a second logical function that processes the first output stream as a second input stream to create a second output stream, and
wherein the analyzing comprises identifying, at compile time, a secure network connection between the first operator and the second operator that uses encryption, and identifying that the first operator and the second operator are connected by a public network;
modifying, based on the compile-time identifying of the secure network connection between the first operator and the second operator, source code of the original flow graph by inserting an explicit partition placement constraint in the source code, wherein the explicit partition placement constraint causes a compiler to fuse the first and second operators;
generating, prior to runtime on a user interface, a visual representation of the source code as modified including the explicit partition placement constraint, wherein the user interface allows a user to edit the source code including the explicit partition placement constraint;
fusing, by the compiler responsive to the explicit partition placement constraint, the first operator with the second operator such that the first logical function is combined with the second logical function; and
generating a modified flow graph as a modification of the original flow graph that combines the first operator and the second operator,
wherein the modified flow graph lacks the encryption between the first operator and the second operator.

2. The computer implemented method of claim 1, further comprising transmitting notification data representative of the modified flow graph to the user interface, the notification data comprising image data describing a visual representation of the modified flow graph.

3. The computer implemented method of claim 2, further comprising updating the modified flow graph based at least in part on user input received from the user having access to the visual representation of the modified flow graph.

4. The computer implemented method of claim 1, further comprising notifying the stream manager regarding the modified flow graph being available for execution of the stream computing application.

5. The computer implemented method of claim 1, wherein, in the modified flow graph, the first operator and the second operator are both in a same processing element.

6. The computer implemented method of claim 1, wherein, in the original flow graph, the first operator is on a first node and the second operator is on a second node.

7. The computer implemented method of claim 6, wherein, in the modified flow graph, the first operator and the second operator are both on the first node.

8. The computer implemented method of claim 1, wherein the identifying of the secure network connection between the first operator and the second operator comprises identifying a parameter of the original flow graph indicative of the secure network connection between the first operator and the second operator.

9. The computer implemented method of claim 1, wherein the identifying of the secure network connection between the first operator and the second operator comprises identifying an annotation in source code for the original flow graph indicative of the secure network connection between the first operator and the second operator.

10. The computer implemented method of claim 1, wherein the identifying of the secure network connection between the first operator and the second operator comprises identifying a data field satisfying a rule-based pattern in the original flow graph indicative of the secure network connection between the first operator and the second operator.

11. A computer program product comprising one or more computer readable storage media, and program instructions collectively stored on the one or more computer readable storage media, the program instructions executable by a processor to cause the processor to perform operations comprising:
  analyzing, at compile time, data associated with an original flow graph comprising a plurality of operators of a stream computing application that are executable on a plurality of nodes according to requests from a stream manager,
  wherein the plurality of operators comprises a first operator and a second operator,
  wherein the first operator includes a first logical function that processes a first input stream to create a first output stream,
  wherein the second operator includes a second logical function that processes the first output stream as a second input stream to create a second output stream, and
  wherein the analyzing comprises identifying, at compile time, a secure network connection between the first operator and the second operator that uses encryption, and identifying that the first operator and the second operator are connected by a public network;
  modifying, based on the compile-time identifying of the secure network connection between the first operator and the second operator, source code of the original flow graph by inserting an explicit partition placement constraint in the source code, wherein the explicit partition placement constraint causes a compiler to fuse the first and second operators;
  generating, prior to runtime on a user interface, a visual representation of the source code as modified including the explicit partition placement constraint, wherein the user interface allows a user to edit the source code including the explicit partition placement constraint;
  fusing, by the compiler responsive to the explicit partition placement constraint, the first operator with the second operator such that the first logical function is combined with the second logical function; and
  generating a modified flow graph as a modification of the original flow graph that combines the first operator and the second operator,
  wherein the modified flow graph lacks the encryption between the first operator and the second operator.

12. The computer program product of claim 11, wherein the stored program instructions are stored in a computer readable storage device in a data processing system, and wherein the stored program instructions are transferred over a network from a remote data processing system.

13. The computer program product of claim 11, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
  program instructions to meter use of the program instructions associated with the request; and
  program instructions to generate an invoice based on the metered use.

14. The computer program product of claim 11, further comprising:
  transmitting notification data representative of the modified flow graph to the user interface, the notification data comprising image data describing a visual representation of the modified flow graph; and
  updating the modified flow graph based at least in part on user input received from the user having access to the visual representation of the modified flow graph.

15. The computer program product of claim 11, wherein, in the modified flow graph, the first operator and the second operator are both in a same processing element.

16. The computer program product of claim 11, wherein, in the original flow graph, the first operator is on a first node and the second operator is on a second node, and wherein, in the modified flow graph, the first operator and the second operator are both on the first node.

17. A computer system comprising a processor and one or more computer readable storage media, and program instructions collectively stored on the one or more computer readable storage media, the program instructions executable by the processor to cause the processor to perform operations comprising:
  analyzing, at compile time, data associated with an original flow graph comprising a plurality of operators of a stream computing application that are executable on a plurality of nodes according to requests from a stream manager,
  wherein the plurality of operators comprises a first operator and a second operator,
  wherein the first operator includes a first logical function that processes a first input stream to create a first output stream,
  wherein the second operator includes a second logical function that processes the first output stream as a second input stream to create a second output stream, and
  wherein the analyzing comprises identifying, at compile time, a secure network connection between the first operator and the second operator that uses encryption, and identifying that the first operator and the second operator are connected by a public network;
  modifying, based on the compile-time identifying of the secure network connection between the first operator and the second operator, source code of the original flow graph by inserting an explicit partition placement constraint in the source code, wherein the explicit partition placement constraint causes a compiler to fuse the first and second operators;
  generating, prior to runtime on a user interface, a visual representation of the source code as modified including the explicit partition placement constraint, wherein the user interface allows a user to edit the source code including the explicit partition placement constraint;

fusing, by the compiler responsive to the explicit partition placement constraint, the first operator with the second operator such that the first logical function is combined with the second logical function; and generating a modified flow graph as a modification of the original flow graph that combines the first operator and the second operator, wherein the modified flow graph lacks the encryption between the first operator and the second operator.

18. The computer system of claim 17, further comprising:
transmitting notification data representative of the modified flow graph to the user interface, the notification data comprising image data describing a visual representation of the modified flow graph; and updating the modified flow graph based at least in part on user input received from the user having access to the visual representation of the modified flow graph.

19. The computer system of claim 17, wherein, in the modified flow graph, the first operator and the second operator are both in a same processing element.

20. The computer system of claim 17, wherein, in the original flow graph, the first operator is on a first node and the second operator is on a second node, and wherein, in the modified flow graph, the first operator and the second operator are both on the first node.

\* \* \* \* \*